(12) United States Patent
Kuntz et al.

(10) Patent No.: US 12,594,861 B2
(45) Date of Patent: Apr. 7, 2026

(54) ADJUSTMENT DEVICE AND VEHICLE SEAT WITH ADJUSTMENT DEVICE

(71) Applicant: Adient US LLC, Plymouth, MI (US)

(72) Inventors: Oliver Kuntz, Wermelskirchen (DE); Van-Toan Ho, Solingen (DE); Frank Schlueter, Moers (DE)

(73) Assignee: Adient US LLC, Plymouth, MI (US)

( * ) Notice: Subject to any disclaimer, the term of this patent is extended or adjusted under 35 U.S.C. 154(b) by 184 days.

(21) Appl. No.: 18/419,972

(22) Filed: Jan. 23, 2024

(65) Prior Publication Data

US 2024/0253533 A1 Aug. 1, 2024

(30) Foreign Application Priority Data

Jan. 31, 2023 (DE) .......................... 102023200778.9
Nov. 23, 2023 (EP) ...................................... 23211811

(51) Int. Cl.
*B60N 2/16* (2006.01)

(52) U.S. Cl.
CPC .................................... *B60N 2/164* (2013.01)

(58) Field of Classification Search
CPC .. B60N 2/02253; B60N 2/02258; B60N 2/16; B60N 2/164; B60N 2/1615; B60N 2/1665; B60N 2/18; B60N 2/1803; B60N 2/185; B60N 2/1853; B60N 2/1605; B60N 2/1635; B60N 2/1695; B60N 2/929
USPC .................................. 297/313, 330, 337, 338
See application file for complete search history.

(56) References Cited

U.S. PATENT DOCUMENTS

| | | | | | |
|---|---|---|---|---|---|
| 5,014,958 | A | * | 5/1991 | Harney | B60N 2/02246 248/419 |
| 5,456,439 | A | * | 10/1995 | Gauger | B60N 2/0224 74/89.33 |
| 5,467,957 | A | * | 11/1995 | Gauger | B60N 2/02246 74/89.33 |
| 6,499,712 | B1 | * | 12/2002 | Clark | B60N 2/072 248/424 |
| 2010/0213341 | A1 | * | 8/2010 | Beneker | B60N 2/233 248/419 |
| 2022/0305965 | A1 | * | 9/2022 | Lücke | B60N 2/02246 |

FOREIGN PATENT DOCUMENTS

| | | | | |
|---|---|---|---|---|
| CN | 110217142 A | 9/2019 | | |
| DE | 19540631 A1 | 5/1997 | | |
| DE | 19709852 A1 | 9/1998 | | |
| DE | 102010002964 A1 | * | 9/2011 | B60N 2/42 |
| DE | 102021107896 A1 | 9/2022 | | |
| DE | 102023210759 A1 | * | 8/2024 | B60N 2/164 |
| WO | WO-2022173243 A1 | * | 8/2022 | B60N 2/0722 |

* cited by examiner

*Primary Examiner* — Ryan D Kwiecinski
(74) *Attorney, Agent, or Firm* — Marshall & Melhorn, LLC

(57) ABSTRACT

A height adjustment device for a component of a vehicle seat may have at least one drive unit having a motor and two height adjustment units. A shaft is arranged between each one of the height adjustment units and the motor and makes it possible to transmit a rotation of the motor to the respective height adjustment unit.

8 Claims, 5 Drawing Sheets

ADJUSTMENT DEVICE AND VEHICLE SEAT WITH ADJUSTMENT DEVICE

FIELD

The invention relates to an adjustment device in the form of a height adjustment device for adjusting a component of a vehicle seat, and to a vehicle seat with such a height adjustment device.

BACKGROUND

Adjustment devices for adjusting a component of a vehicle seat, for example a backrest or a seat part, are generally known. Drive devices for operating and adjusting a seat function are known both for vehicle seat height adjusters and for backrest adjusters. The drive devices are often electric drives or mechanical bidirectional step-by-step switching systems. Such mechanisms are conventional as load-absorbing systems in height adjusters. When used as backrest adjusters, the driven backrest fitting, which is in the form of a geared fitting, generally absorbs the working loads and crash loads. Known drive devices are disclosed, for example, in DE 197 09 852 A1 and DE 195 40 631 A1.

The invention is based on the problem of improving a height adjustment device of the type mentioned in the introduction, in particular to design it in a compact and straightforward way, and to provide a corresponding vehicle seat.

The first-mentioned problem is solved according to the invention by a height adjustment device for a component of a vehicle seat and the second-mentioned problem is solved according to the invention by a vehicle seat having the features of the claims described herein.

The dependent claims relate to advantageous refinements.

SUMMARY

The adjustment device according to the invention, which is in the form of a height adjustment device, for adjusting a component of the vehicle seat comprises at least one drive unit having a motor and two spindle units, wherein a shaft, in particular a drive shaft, is arranged between each one of the spindle drives and the motor and makes it possible to transmit a rotation of the motor to the respective spindle unit, in particular to a threaded spindle (also referred to as adjusting spindle) or a spindle nut (also referred to as adjusting nut).

In other words: the height adjustment device according to the invention can comprise at least one drive unit having a motor and two height adjustment units, wherein a shaft is arranged between each one of the height adjustment units and the motor and makes it possible to transfer a rotation of the motor to the respective height adjustment unit.

The advantages obtained by the invention consist in particular in that, in the case of such a height adjustment device having a simple construction and only a single motor for two height adjustment units, the structural space requirement for the height adjustment device is reduced and a free space below a seat part of the vehicle seat is optimized. Moreover, the number of components of the height adjustment device is reduced.

The shaft is preferably in the form of a flexible shaft.

The respective height adjustment unit may for example comprise a spindle unit, with the motor being operatively connected, in particular coupled in terms of movement, directly to the associated spindle unit on either side via the respective shaft. As an alternative, the respective height adjustment unit may additionally comprise a gear unit, with the motor being operatively connected, in particular coupled in terms of movement, to the associated spindle unit on either side via the respective shaft and indirectly via the gear unit.

The adjustment, in particular a height adjustment, of the component, for example the vehicle seat, in particular two seat frame parts of the vehicle seat, can be performed by the spindle units, in particular a threaded spindle (also referred to as adjusting spindle), which runs in a fixed spindle nut, or a spindle nut (also referred to as adjusting nut), which engages around and can be moved along a stationary threaded spindle. In other words: the threaded spindle may have a fixed arrangement and the spindle nut may be arranged drivably and movably on the threaded spindle. As an alternative, the spindle nut may have a fixed design and the threaded spindle may have a rotatable design.

The spindle unit may for example be articulated on the one hand on a seat base part and on the other hand on a movable seat part or on the gear unit fixedly connected to this seat part. The two spindle units may be connected to one another by a crossmember. The crossmember may furthermore be in the form, for example, of a motor bridge.

The motor, in particular an electric motor, may be arranged and held in the motor bridge. The motor bridge may be arranged between and interconnect two seat frame parts of the vehicle seat. The motor is preferably arranged in the middle of the motor bridge. Guide channels or shaft channels in the motor bridge for receiving a respective flexible shaft portion may be provided on either side of the motor.

The crossmember in the form of a motor bridge may, for example, have a middle receiving portion for receiving and holding the motor and two side portions, adjoining the middle receiving portion, for receiving and holding the shafts. The motor bridge may be in the form of an upwardly open profile.

Since the drive unit comprises only one motor and two spindles, the height adjuster has a compact and simple structure, with the result that the adjustment device has a space-saving design.

The vehicle seat according to the invention comprises at least the height adjustment device described above for adjusting the component, in particular the seat part of the vehicle seat. The vehicle seat may in particular comprise two seat frame sides which are coupled or connected to one another by the height adjustment device.

DESCRIPTION OF THE FIGURES

The invention will be explained in more detail below on the basis of advantageous exemplary embodiments illustrated in the figures. However, the invention is not restricted to these exemplary embodiments. In the figures.

DETAILED DESCRIPTION

Parts which correspond to one another are provided with the same reference signs in all the figures.

Figure 1:
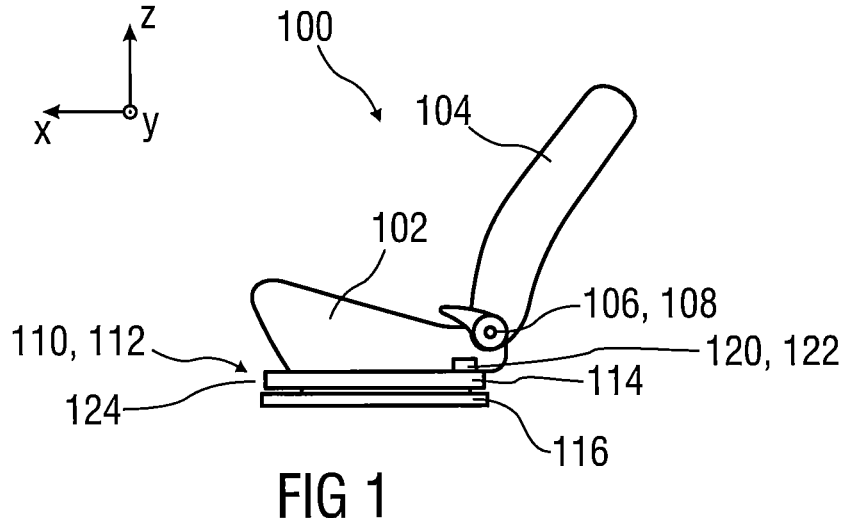
FIG. 1: shows a schematic illustration of a vehicle seat with a longitudinal adjustment device according to the prior art.

A vehicle seat 100, which is illustrated schematically in FIG. 1 and relates to the prior art, will be described below using three spatial directions extending perpendicularly in relation to one another. In the case of a vehicle seat 100 installed in the vehicle, a longitudinal direction x extends largely horizontally and preferably parallel to a vehicle longitudinal direction which corresponds to the normal direction of travel of the vehicle. A transverse direction y which extends perpendicularly in relation to the longitudinal direction x is likewise oriented horizontally in the vehicle and extends parallel to a vehicle transverse direction. A vertical direction z extends perpendicularly in relation to the longitudinal direction x and perpendicularly in relation to the transverse direction y. In the case of a vehicle seat 100 which is installed in the vehicle, the vertical direction z extends preferably parallel to a vehicle vertical axis.

The positional indications and directional indications used, such as front, rear, top and bottom, relate to a viewing direction of an occupant seated in the vehicle seat 100 in a normal seating position, wherein the vehicle seat 100 is installed in the vehicle, in a use position suitable for passenger transport, with an upright backrest 104, and as is conventional is oriented in the direction of travel. The vehicle seat 100 may, however, also be installed or moved in a differing orientation, for example transversely with respect to the direction of travel. Unless described differently, the vehicle seat 100 is constructed mirror-symmetrically with respect to a plane extending perpendicularly in relation to the transverse direction y.

The backrest 104 can be arranged pivotably on a seat part 102 of the vehicle seat 100. For this purpose, the vehicle seat 100 can optionally comprise a fitting 106, in particular an adjustment fitting, rotary fitting, latching fitting or tumbling fitting.

The positional indications and directional indications used, such as radially, axially and in the circumferential direction, relate to an axis of rotation 108 of the fitting 106. Radially means perpendicularly in relation to the axis of rotation 108. Axially means in the direction of or parallel to the axis of rotation 108.

The vehicle seat 100 can optionally comprise a longitudinal adjustment device 110. The longitudinal adjustment device 110 comprises, for example, a rail arrangement 112 with a first rail element 114 and a second rail element 116. The first rail element 114 is adjustable in the longitudinal direction x relative to the second rail element 116. The first rail element 114 is fastened to the seat part 102. The second rail element 116 is fastened to a structural element of a vehicle, for example to a vehicle floor.

Furthermore, the vehicle seat 100 may comprise a further adjustment device 120, which is in the form of a height adjustment device 122. The adjustment device 120 is connected on the one hand to the seat part 102 and on the other hand to a seat base part 124, in particular the rail arrangement 112. The seat part 102 may be mounted pivotably at one end for height adjustment purposes and be provided with the adjustment device 120 at the opposite end. As an alternative, an adjustment device 120 may be provided at each end of the seat part 102.

For better clarity, the first rail element 114 is referred to in the description below as top rail 114. This top rail 114 (also referred to as running rail or slide) is assigned to the vehicle seat 100 and configured to carry this vehicle seat 100. The second rail element 116 is referred to below as bottom rail 116. The bottom rail 116 is fixed and connected, for example, to the floor of a vehicle.

Figure 2:
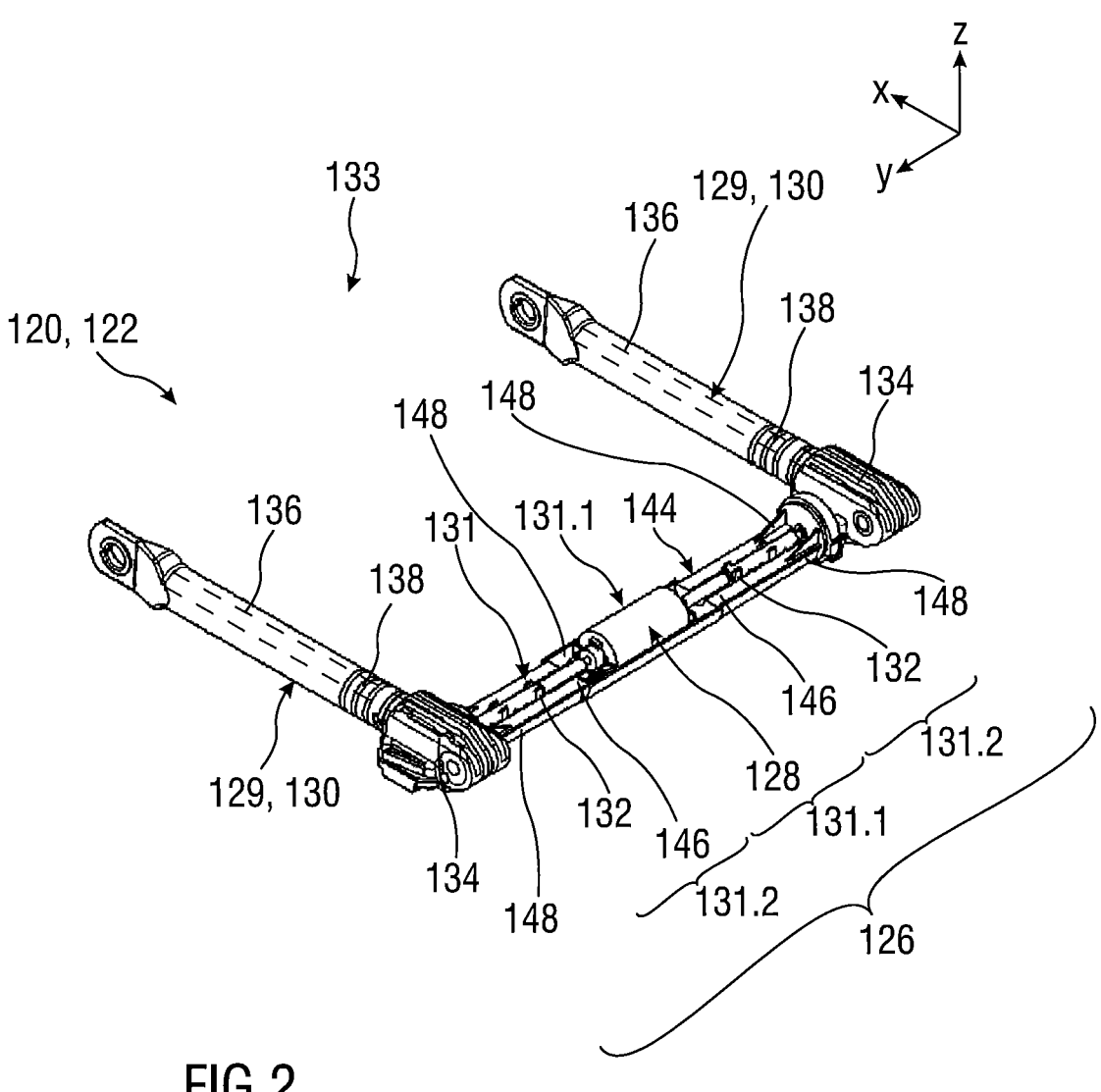
FIG. 2: shows a perspective view of a first exemplary embodiment of an adjustment device according to the invention in the form of a height adjustment device.

FIG. 2 shows the adjustment device 120 in the form of a height adjustment device 122 in detail. The height adjustment device 122 is arranged in particular in the rear region of the vehicle seat 100 (illustrated in FIG. 1) as seen in the longitudinal direction x.

The height adjustment device 122 for adjusting a component, for example the seat part 102, of the vehicle seat 100 comprises at least one drive unit 126 having a motor 128, for example an electric motor, and two height adjustment units 129. The respective height adjustment unit 129 may be in the form of a spindle unit 130. A shaft 132, in particular a drive shaft, is arranged between each one of the spindle units 130 and the motor 128. Rotation of the motor 128 can be transmitted to the respective spindle unit 130, in particular to a threaded spindle 136 (also referred to as adjusting thread, first exemplary embodiment according to FIGS. 2 to 4) or a spindle nut 140 (also referred to as adjusting nut, second exemplary embodiment according to FIG. 5).

The motor 128 has two directions of rotation. Each actuation and thus each rotation of the motor 128 results in rotation of the two spindle units 130 and thus an upward or downward height adjustment. A respective gear unit 134 may be arranged between the motor 128 and the spindle units 130. Various transmission ratios can be set by the gear units 134. As an alternative, the respective shaft 132 may be coupled, in particular operatively connected or coupled in terms of movement, directly to the associated spindle unit 130.

The shaft 132 is preferably in the form of a flexible shaft. The adjustment, in particular a height adjustment, of the component, for example the vehicle seat 100, can be performed by the spindle units 130, in particular a drivable threaded spindle 136 (also referred to as adjusting spindle or rotary spindle), which runs in a fixed spindle nut 138 (illustrated in FIGS. 2 to 4), or a drivable spindle nut 140 (also referred to as adjusting nut or rotary nut), which engages around and can be moved along a fixed threaded spindle 142 (illustrated in FIG. 5).

The two spindle units 130 are connected to one another by a crossmember 131. The crossmember 131 may be in the form of a motor bridge 144.

The motor 128, in particular an electric motor, may be arranged and held in the motor bridge 144. The motor 128 is preferably arranged in the middle of the motor bridge 144. Guide channels 146 for receiving each of the flexible shafts 132 arranged on either side and/or stiffening elements 148 in the motor bridge 144 may be provided on either side of the motor 128. In other words: the crossmember 131 in the form of a motor bridge 144 comprises a middle receiving portion 131.1 for receiving and holding the motor 128 and two side portions 131.2, adjoining the middle receiving portion, for receiving and holding the shafts 132.

Since the drive unit 126 comprises only a single motor 128 and two spindle units 130, the height adjustment device 122 has a compact and simple structure and thus a space-saving design.

The components, in particular the two spindle units 130, the motor bridge 144, the motor 128 and the two shafts 132, of the height adjustment device 122 may be premounted to form a mounting unit 133, as illustrated in FIG. 2.

Figure 3:
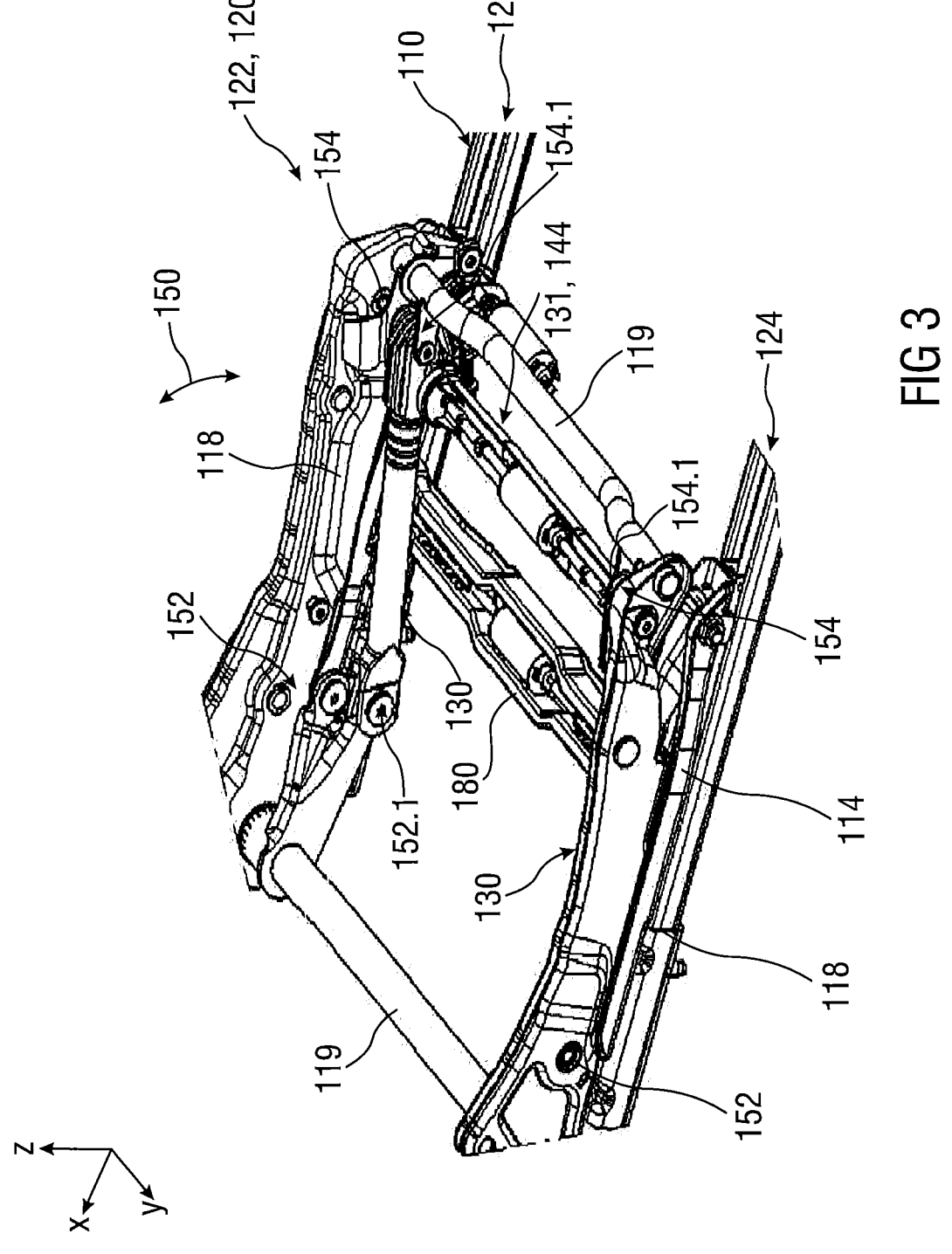
FIG. 3: shows a further perspective view of the adjustment device, in the form of a height adjustment device, in the installed state.

FIG. 3 shows a further perspective view of the height adjustment device 122 according to a first exemplary embodiment in the installed state.

Figure 4:
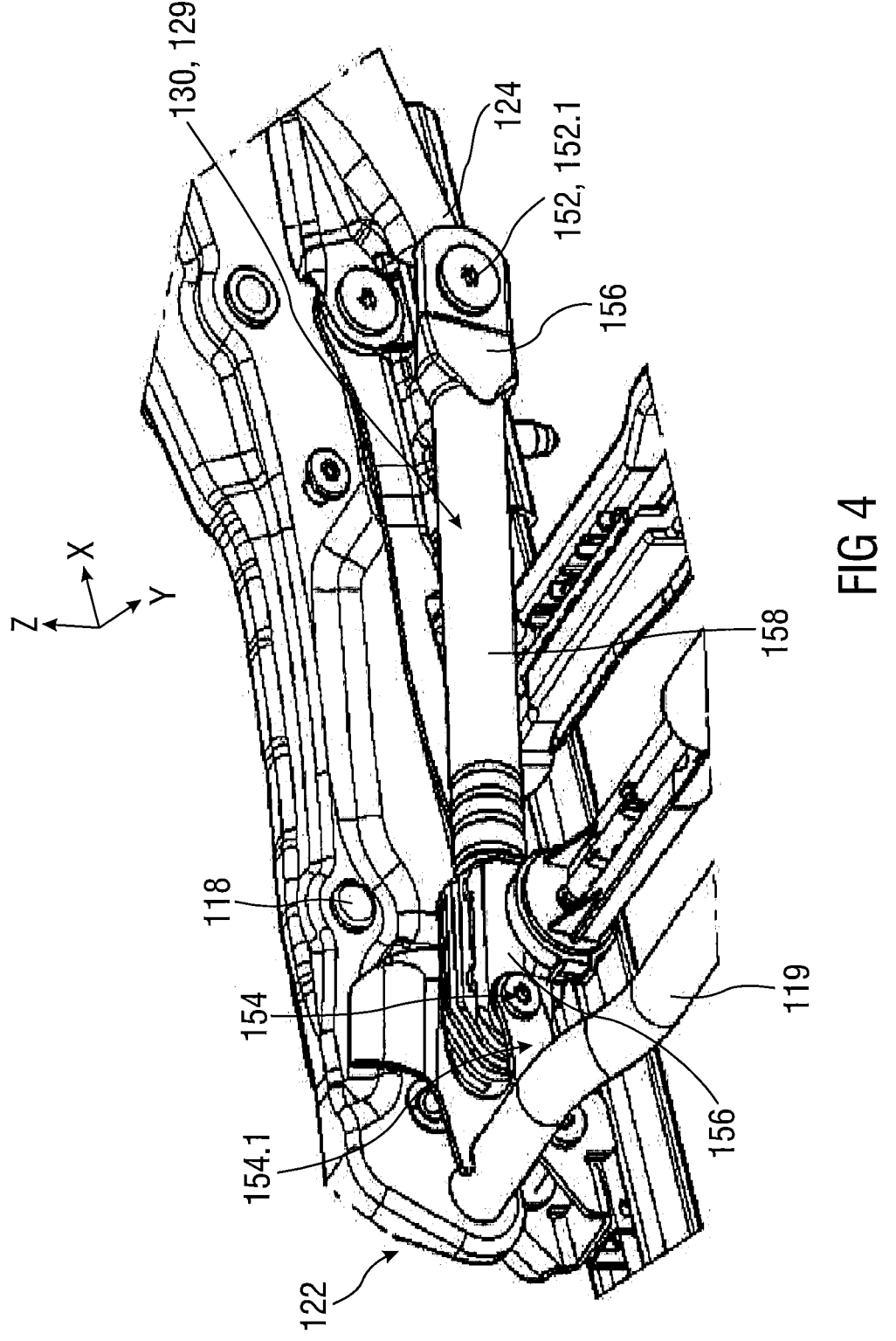
FIG. 4: shows an enlarged perspective view of the height adjustment device according to FIG. 3 in detail

The vehicle seat 100 comprises two seat frame parts 118, only one of which is shown in FIG. 4. The two seat frame parts 118 are connected to one another by the crossmember 131 in the form of a motor bridge 144.

The two seat frame parts 118 may optionally be connected to one another by at least one tube 119 in the form of a transverse tube, in the known way.

The seat frame parts 118 serve to fasten and hold the seat part 102 on a seat base part 124. In the exemplary embodiment shown, the seat base part 124 is in the form of a rail arrangement 112 of a longitudinal adjustment device 110. The seat frame parts 118 are in particular fastened to the respective top rail 114 of the rail arrangement 112.

The motor bridge 144 is arranged between the two seat frame parts 118 and connects them to one another. Since the vehicle seat 100 according to FIG. 2 also comprises the longitudinal adjustment device 110, which is driven by a motor, a further motor bridge 180 for the longitudinal adjustment device 110 is arranged between the two top rails 114. As an alternative, this longitudinal adjustment device 110 can be omitted and a fixed seat base part 124 may be provided.

The height adjustment device 122 is arranged between the seat base part 124 and the seat part 102, in particular the seat frame parts 118. The height adjustment device 122 makes it possible to adjust, in particular adjust the height of or vertically move, for example pivot or obliquely pivot, the seat part 102 relative to the seat base part 124, in particular the rail arrangement 112.

An output (also referred to as output side) of the motor 128 of the height adjustment device 122 is connected to the flexible shaft 132 on either side. The respective shaft 132 is intrinsically rotationally fixed and can thus transmit moments with the greatest possible angular accuracy. The respective shaft 132 is rotationally fixedly connected to the drivable threaded spindle 136 (illustrated in FIG. 2). The drivable threaded spindle 136 is supported on the rigidly held or fixed spindle nut 138 (illustrated in FIG. 2), with the result that rotational movements of the drivable threaded spindle 136, generated by rotations of the motor 128 with two directions of rotation, result in a height adjustment of the seat part 102, as per arrow 150.

The respective spindle unit 130 is arranged, in particular articulated, on the one hand on a first articulation point 152 on the seat base part 124 and on the other hand on a second articulation point 154 on the seat part 102 or on a component fixedly connected to this seat part 102. The first articulation point 152 is in the form, for example, of a rotary bearing 152.1. The second articulation point 154 may be in the form, for example, of a joint mechanism, for example a toggle lever mechanism 154.1.

FIG. 4 shows an enlarged perspective view of the height adjustment device 122 according to FIG. 3 in detail.

For example, the height adjustment device 122 may be fastened articulately to the tube 119 in the form of a transverse tube of the vehicle seat 100 by a mount 156, in particular articulated by the toggle lever mechanism 154.1.

The spindle unit 130 comprises a stable spindle housing 158, which is fastened to the seat base part 124 or the seat frame part 118 or the tube 119 at the articulation points 152 and 154 via mounts 156.

The height adjustment device 122 makes it possible to adjust the height of the seat part 102 relative to the seat base part 124.

Figure 5:
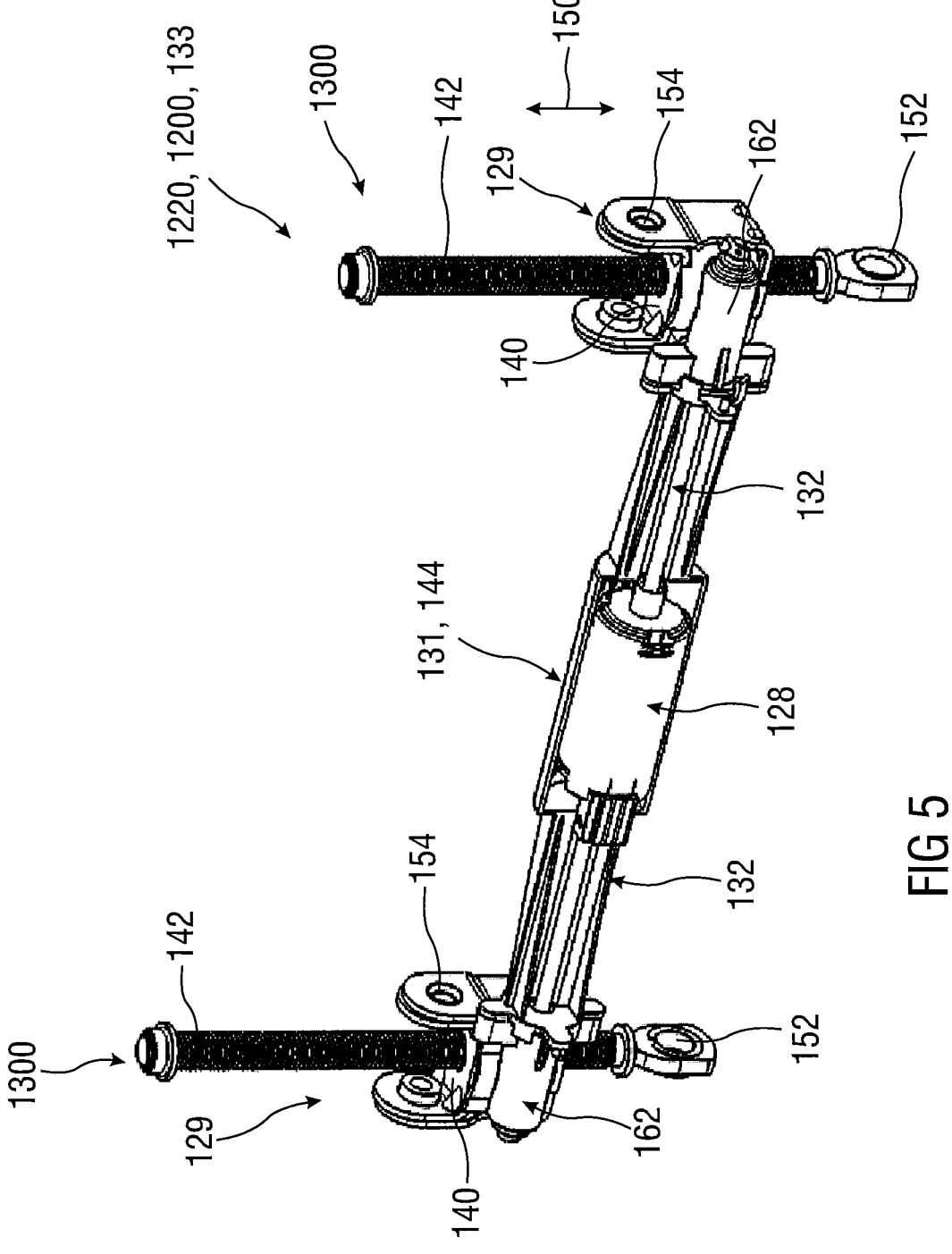
FIG. 5: shows a perspective view of a second exemplary embodiment of an adjustment device according to the invention in the form of a height adjustment device.

FIG. 5 shows a perspective view of a second exemplary embodiment of an adjustment device 1200 according to the invention, which is in the form of a height adjustment device 1220. The height adjustment device 1220 may also be premounted to form a mounting unit 133.

The second exemplary embodiment differs only in terms of the structure of the spindle unit 1300 and the coupling to the motor 128.

The spindle unit 1300 comprises a drivable spindle nut 140 (also referred to as adjusting nut or rotary nut) which engages around a fixed threaded spindle 142 and can be moved along this threaded spindle 142 as per arrow 150 for height adjustment purposes (illustrated in FIG. 5). The motor 128 is coupled directly to the spindle drive units 162 on either side via the flexible shafts 132. The spindle drive units 162 and the fixed threaded spindle 142 can analogously be fastened to the seat base part 124 or the seat frame part 118 or the tube 119 (illustrated in FIGS. 3 and 4) at the articulation points 152 and 154 of the height adjustment device 122 via mounts 156.

The motor 128 is analogously arranged and held in the middle of the motor bridge 144, which is in the form of a crossmember 131.

LIST OF REFERENCE SIGNS

100 Vehicle seat
102 Seat part
104 Backrest
106 Fitting
108 Axis of rotation
110 Longitudinal adjustment device
112 Rail arrangement
114 First rail element (top rail)
116 Second rail element (bottom rail)
118 Seat frame part
119 Tube
120, 1200 Adjustment device
122, 1220 Height adjustment device
124 Seat base part
126 Drive unit
128 Motor
129 Height adjustment unit
130, 1300 Spindle unit
131 Crossmember
131.1 Middle receiving portion
131.2 Side portion
132 Shaft
133 Mounting unit
134 Gear unit
136 Drivable threaded spindle
138 Fixed spindle nut
140 Drivable spindle nut
142 Fixed threaded spindle
144 Motor bridge
146 Guide channel
148 Stiffening element
150 Arrow
152 First articulation point
152.1 Rotary bearing
154 Second articulation point
154.1 Toggle lever mechanism
156 Mount
158 Spindle housing

162 Spindle drive unit
180 Further motor bridge
x Longitudinal direction
y Transverse direction
z Vertical direction

What is claimed is:

1. A height adjustment device for a component of a vehicle seat, comprising:

at least one drive unit having a motor arranged and held in a motor bridge and two height adjustment units, each of the two height adjustment units is configured as a spindle unit and coupled to the motor by a shaft, wherein each one of the shafts is arranged between each one of the height adjustment units and the motor and makes it possible to transmit a rotation of the motor to one of the two height adjustment units, wherein the two spindle units, the motor bridge, the motor and the two shafts of the both height adjustment devices are pre-mounted in a mounting unit, wherein the two spindle units are connected to one another by a crossmember which is formed as the motor bridge.

2. The height adjustment device as claimed in claim 1, wherein each shaft is in the form of a flexible shaft.

3. The height adjustment device as claimed in claim 1, wherein each height adjustment unit comprises a spindle unit and the motor is coupled in terms of movement directly to the associated spindle unit on either side via one of the shafts.

4. The height adjustment device as claimed in claim 3, wherein a first end portion of the spindle unit is articulated on a seat base part and a second end portion of the spindle unit is articulated on a movable seat part or on the gear unit fixedly connected to the seat part.

5. The height adjustment device as claimed in claim 1, wherein each height adjustment unit additionally comprises a gear unit and the motor is coupled in terms of movement to the spindle unit, indirectly via the gear unit, on either side via one of the shafts.

6. The height adjustment device as claimed in claim 1, wherein the motor bridge has a middle receiving portion for receiving and holding the motor and two side portions, adjoining the middle receiving portion, for receiving and holding the shaft.

7. The height adjustment device as claimed in claim 6, wherein the motor bridge is in the form of an upwardly open profile.

8. A vehicle seat with the height adjustment device as claimed in claim 1.

* * * * *